US008386243B2

(12) United States Patent
Nilsson et al.

(10) Patent No.: US 8,386,243 B2
(45) Date of Patent: Feb. 26, 2013

(54) REGENERATION OF WIDEBAND SPEECH

(75) Inventors: Mattias Nilsson, Sundbyberg (SE); Soren Vang Andersen, Aalborg (DK); Koen Bernard Vos, San Francisco, CA (US)

(73) Assignee: Skype, Dublin (IE)

( * ) Notice: Subject to any disclaimer, the term of this patent is extended or adjusted under 35 U.S.C. 154(b) by 866 days.

(21) Appl. No.: 12/456,033

(22) Filed: Jun. 10, 2009

(65) Prior Publication Data

US 2010/0145685 A1 Jun. 10, 2010

(30) Foreign Application Priority Data

Dec. 10, 2008 (GB) .................................. 0822537.7

(51) Int. Cl.

| | |
|---|---|
| ***G06F 15/00*** | (2006.01) |
| ***G10L 11/00*** | (2006.01) |
| ***G10L 19/00*** | (2006.01) |
| ***G10L 21/00*** | (2006.01) |
| ***G10L 19/14*** | (2006.01) |
| ***G10L 11/04*** | (2006.01) |
| ***G10L 21/02*** | (2006.01) |

(52) U.S. Cl. ..................... 704/205; 704/200; 704/200.1; 704/207; 704/226

(58) Field of Classification Search .................. 704/200, 704/200.1, 205, 207, 226

See application file for complete search history.

(56) References Cited

U.S. PATENT DOCUMENTS 4,734,795 A * 3/1988 Fukami et al. .................... 360/8
5,012,517 A 4/1991 Wilson et al.
5,060,269 A 10/1991 Zinser
5,214,708 A * 5/1993 McEachern .................. 704/266
5,305,420 A 4/1994 Nakamura et al.
5,621,856 A 4/1997 Akagiri
5,687,191 A 11/1997 Lee et al.
5,715,365 A * 2/1998 Griffin et al. ................ 704/214
5,956,674 A 9/1999 Smyth et al.

(Continued)

FOREIGN PATENT DOCUMENTS

CA 2618316 1/2007
EP 1300833 4/2003

(Continued)

OTHER PUBLICATIONS

International Search Report from PCT/EP2009/066876, date of mailing Jun. 11, 2010, 3 pp.

(Continued)

*Primary Examiner* — Eric Yen
(74) *Attorney, Agent, or Firm* — Wolfe-SBMC

(57) ABSTRACT

A method and system for regenerating wideband speech from narrowband speech. The method comprises: receiving samples of a narrowband speech signal in a first range of frequencies; modulating received samples of the narrowband speech signal with a modulation signal having a modulating frequency adapted to upshift each frequency in the first range of frequencies by an amount determined by the modulating frequency wherein the modulating frequency is selected to translate into a target band a selected frequency band within the first range of signals; filtering the modulated samples using a high pass filter to form a regenerated speech signal in the target band, wherein the lower limit of the high pass filter defines the lowermost frequency in the target band; and combining the narrow band speech signal with the regenerated speech signal in the target band to regenerate a wideband speech signal.

19 Claims, 3 Drawing Sheets

U.S. PATENT DOCUMENTS

| | | | | |
|---|---|---|---|---|
| 6,055,501 | A * | 4/2000 | MacCaughelty | 704/272 |
| 6,058,360 | A | 5/2000 | Bergstrom | |
| 6,188,981 | B1 | 2/2001 | Benyassine et al. | |
| 6,226,606 | B1 | 5/2001 | Acero et al. | |
| 6,424,939 | B1 | 7/2002 | Herre et al. | |
| 6,453,283 | B1 * | 9/2002 | Gigi | 704/207 |
| 6,456,963 | B1 | 9/2002 | Araki | |
| 6,507,820 | B1 | 1/2003 | Deutgen | |
| 6,526,384 | B1 * | 2/2003 | Mueller et al. | 704/501 |
| 6,680,972 | B1 * | 1/2004 | Liljeryd et al. | 375/240 |
| 6,687,667 | B1 | 2/2004 | Gournay et al. | |
| 6,917,911 | B2 | 7/2005 | Schultz | |
| 7,003,451 | B2 | 2/2006 | Kjorling et al. | |
| 7,171,357 | B2 | 1/2007 | Boland | |
| 7,177,803 | B2 | 2/2007 | Boillot et al. | |
| 7,337,118 | B2 | 2/2008 | Davidson et al. | |
| 7,359,854 | B2 | 4/2008 | Nilsson et al. | |
| 7,398,204 | B2 | 7/2008 | Najaf-Zadeh et al. | |
| 7,433,817 | B2 | 10/2008 | Kjorling et al. | |
| 7,461,003 | B1 | 12/2008 | Tanrikulu | |
| 7,478,045 | B2 | 1/2009 | Allamanche et al. | |
| 7,792,679 | B2 | 9/2010 | Virette et al. | |
| 7,848,921 | B2 | 12/2010 | Ehara | |
| 8,041,577 | B2 | 10/2011 | Smaragdis et al. | |
| 8,078,474 | B2 | 12/2011 | Vos et al. | |
| 8,160,889 | B2 | 4/2012 | Iser et al. | |
| 8,332,210 | B2 | 12/2012 | Nilsson | |
| 2001/0029445 | A1 | 10/2001 | Charkani | |
| 2002/0165711 | A1 | 11/2002 | Boland | |
| 2003/0009327 | A1 | 1/2003 | Nilsson et al. | |
| 2003/0012221 | A1 | 1/2003 | El-Maleh et al. | |
| 2003/0028386 | A1 * | 2/2003 | Zinser et al. | 704/500 |
| 2003/0050786 | A1 * | 3/2003 | Jax et al. | 704/500 |
| 2003/0158726 | A1 * | 8/2003 | Philippe et al. | 704/203 |
| 2006/0149532 | A1 | 7/2006 | Boillot et al. | |
| 2006/0200344 | A1 * | 9/2006 | Kosek et al. | 704/226 |
| 2006/0277039 | A1 | 12/2006 | Vos et al. | |
| 2008/0077399 | A1 | 3/2008 | Yoshida | |
| 2008/0120117 | A1 | 5/2008 | Choo et al. | |
| 2008/0177532 | A1 | 7/2008 | Greiss et al. | |
| 2008/0195392 | A1 | 8/2008 | Iser et al. | |
| 2008/0270125 | A1 | 10/2008 | Choo et al. | |
| 2010/0145684 | A1 | 6/2010 | Nilsson et al. | |
| 2010/0223052 | A1 | 9/2010 | Nilsson et al. | |

FOREIGN PATENT DOCUMENTS

| | | | |
|---|---|---|---|
| WO | WO 98/57436 | A2 | 12/1998 |
| WO | WO-0135395 | | 5/2001 |
| WO | WO 02056301 | | 7/2002 |
| WO | WO-03003600 | | 1/2003 |
| WO | WO 03/044777 | A1 | 5/2003 |
| WO | WO 2004/072958 | A1 | 8/2004 |
| WO | WO-2006116025 | | 11/2006 |

OTHER PUBLICATIONS

Written Opinion of the International Searching Authority from PCT/EP2009/066876, date of mailing Jun. 11, 2010, 4 pp.

International Search Report for Application No. GB0822537.7, dated Apr. 6, 2009, 2 pages.

International Search Report and Written Opinion PCT Application PCT/EP2009/066847, (May 31, 2010), 8 pages.

International Search Report, GB Application 0822536.9, (Mar. 27, 2009), 1 page.

Non-Final Office Action, U.S. Appl. No. 12/456,012, (Jun. 13, 2012), 14 pages.

Makhoul, John et al., "High-Frequency Regeneration in Speech Coding Systems", *IEEE*; XP-001122019, (1979), 4 pages.

Non-Final Office Action, U.S. Appl. No. 12/635,235, (Aug. 24, 2012), 15 pages.

Notice of Allowance, U.S. Appl. No. 12/456,012, (Sep. 7, 2012), 4 pages.

"Foreign Notice of Allowance", EP Application No. 09799076.6, (Oct. 15, 2012), 6 pages.

* cited by examiner

REGENERATION OF WIDEBAND SPEECH

The present invention lies in the field of artificial bandwidth extension (ABE) of narrow band telephone speech, where the objective is to regenerate wideband speech from narrowband speech in order to improve speech naturalness.

In many current speech transmission systems (phone networks for example) the audio bandwidth is limited, at the moment to 0.3-3.4 kHz. Speech signals typically cover a wider band of frequencies, between 50 Hz and 8 kHz being normal. For transmission, a speech signal is encoded and sampled, and a sequence of samples is transmitted which defines speech but in the narrowband permitted by the available bandwidth. At the receiver, it is desired to regenerate the wideband speech, using an ABE method.

ABE algorithms are commonly based on a source-filter model of speech production, where the estimation of the wideband spectral envelope and the wideband excitation regeneration are treated as two independent sub-problems. Moreover, ABE algorithms typically aim at doubling the sampling frequency, for example from 7 to 14 kHz or from 8 to 16 kHz. Due to the lack of shared information between the narrowband and the missing wideband representations, ABE algorithms are prone to yield artefacts in the reconstructed speech signal. A pragmatic approach to alleviate some of these artefacts is to reduce the extension frequency band, for example to only increase the sampling frequency from 8 kHz-12 kHz. While this is helpful, it does not resolve the artefacts completely.

Known spectral-based excitation regeneration techniques either translate or fold the frequency band 0-4 kHz into the 4-8 kHz frequency band. In fact, in speech signals transmitted through current audio channels, the audio bandwidth is 0.3-3.4 kHz (that is, not precisely 0-4 kHz). Translation of the lower frequency band (0-4 kHz) into the upper frequency band (4-8 kHz) results in the frequency sub-band 0-2 kHz being translated (possibly pitch dependent) into the 4-6 kHz sub-band. Due to the commonly much stronger harmonics in the 0-2 kHz region, this typically yields metallic artefacts in the upper band region. Spectral folding produces a mirrored copy of the 2-4 kHz band into the 4-6 kHz band but without preserving the harmonic structure during voice speech. Another possibility is folding and translation around 3.5 kHz for the 7 to 14 kHz case.

A paper entitled "High Frequency Regeneration In Speech Coding Systems", authored by Makhoul, et al, IEEE International Conference Acoustics, Speech and Signal Processing, April 1979, pages 428-431, discusses these techniques. FIG. 1 is a block diagram of a typical receiver for a baseband decoder in a radio transmission system. A decoder 2 receives a signal transmitted over a transmission channel and decodes the signal to recover speech samples v which were encoded and transmitted at the transmitter (not shown). The speech residual samples v are subject to interpolation at an interpolator 4 to generate a baseband speech signal b. This is in the narrowband 0.3-3.4 kHz. The signal is subject to high frequency regeneration 6 followed by high pass filtering 8. The resulting signal z represents the regenerated wideband part of the speech signal and is added to the narrowband part b at adder 10. The added signal is supplied to a filter 12 (typically an LPC based synthesis filter) which generates an output speech signal r. A number of different high frequency regeneration techniques are discussed in the paper. For a doubling of the sampling frequency spectral folding is obtained by inserting a zero between every speech signal sample. This creates a mirrored spectrum around the frequency corresponding to half the original sampling frequency. Such processing destroys the harmonic structure of the speech signal (unless the fundamental frequency is a multiple of the sampling frequency). Moreover, since speech harmonicity typically decreases as a function of frequency, the spectral folding show too strong spectral peaks in the highest frequencies resulting in strong metallic artefacts.

In a spectral translation approach discussed in the paper, the high band excitation is constructed by adding up-sampled low pass filtered narrowband excitation to a mirrored up-sampled and high pass filtered narrowband excitation.

The mirrored up-sampled narrowband excitation is obtained by first multiplying each sample with $(-1)^n$, where n denotes the sample index, and then inserting a zero between every sample. Finally, the signal is high pass filtered. As for the spectral folding, the location of the spectral peaks in the high band are most likely not located at a multiple of the pitch frequency. Thus, the harmonic structure is not necessarily preserved in this approach.

It is an aim of the present invention to generate more natural speech from a narrowband speech signal.

According to an aspect of the present invention there is provided a method of regenerating wideband speech from narrowband speech, the method comprising: receiving samples of a narrowband speech signal in a first range of frequencies; modulating received samples of the narrowband speech signal with a modulation signal having a modulating frequency adapted to upshift each frequency in the first range of frequencies by an amount determined by the modulating frequency wherein the modulating frequency is selected to translate into a target band a selected frequency band within the first range of signals; filtering the modulated samples using a high pass filter to form a regenerated speech signal in the target band, wherein the lower limit of the high pass filter defines the lowermost frequency in the target band; and combining the narrow band speech signal with the regenerated speech signal in the target band to regenerate a wideband speech signal.

It is advantageous to select the modulating frequency so as to upshift a frequency band in the narrowband that is more likely to have a harmonic structure closer to that of the missing (high) frequency band to which it is translated.

Another aspect of the invention provides a system for generating wideband speech from narrowband speech, the system comprising: means for receiving samples of a narrowband speech signal in a first range of frequencies; means for modulating received samples of the narrowband speech signal with a modulation signal having a modulating frequency adapted to upshift each frequency in the first range of frequencies by an amount determined by the modulating frequency wherein the modulating frequency is selected to translate into a target band a selected frequency band within the first range of signals; a high pass filter for filtering the modulated samples to form a regenerated speech signal in a target band when the lower limit of the high pass filter is above the uppermost frequency of the narrowband speech; and means for combining the narrowband speech signal with the regenerated speech signal in the target band to regenerate a wideband speech signal.

Further improvements can be gained by selecting a frequency band in the narrowband speech signal that has a good signal-to-noise ratio, and modulating that frequency band for regenerating the missing high frequency band.

It is also possible to average a set of translated signals from overlapping or non-overlapping frequency bands in the narrowband speech signal.

For a better understanding of the present invention and to show how the same may be carried into effect, reference will now be made by way of example to the accompanying drawings in which.

Figure 1:
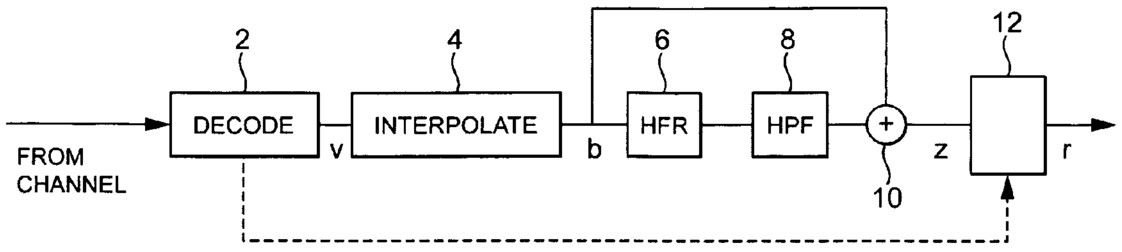
FIG. 1 is a schematic block diagram of a prior art HFR approach.
Figure 2:
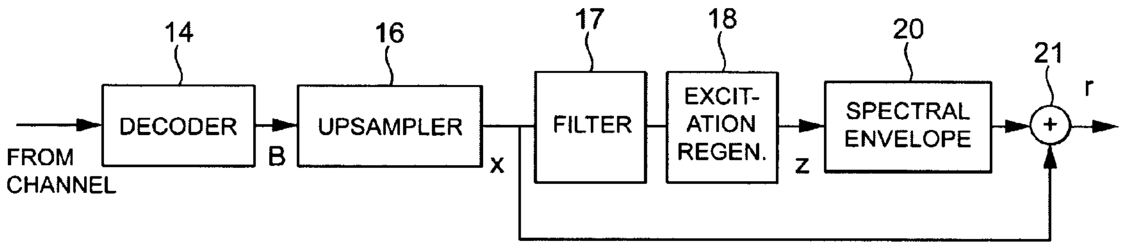
FIG. 2 is a schematic block diagram illustrating the context of the invention.

Reference will first be made to FIG. 2 to describe the context of the invention.

FIG. 2 is a schematic block diagram illustrating an artificial bandwidth extension system in a receiver. A decoder 14 receives a speech signal over a transmission channel and decodes it to extract a baseband speech signal B. This is typically at a sampling frequency of 8 kHz. The baseband signal B is up-sampled in up-sampling block 16 to generate an up-sampled decoded narrowband speech signal x. The speech signal x is subject to a whitening filter 17 and then wideband excitation regeneration in excitation regeneration block 18 and an estimation of the wideband spectral envelope is then applied at block 20 The thus regenerated extension (high) frequency band of the speech signal is added to the incoming narrowband speech signal x at adder 21 to generate the wideband recovered speech signal r.

Embodiments of the present invention relate to excitation regeneration in the scenario illustrated in the schematic of FIG. 2. In the following described embodiments, a pitch dependent spectral translation translates a frequency band (a range of frequencies from the narrowband speech signal) into a target frequency band with properly preserved harmonics. In the embodiment discussed below, the range of the frequencies from 2-4 kHz is translated to the target frequency band of between 4 and 6 kHz. However, it will be clear from the following that these can be selected differently without diverging from the concepts of the invention. They are used here merely as exemplifying numbers.

Figure 3:
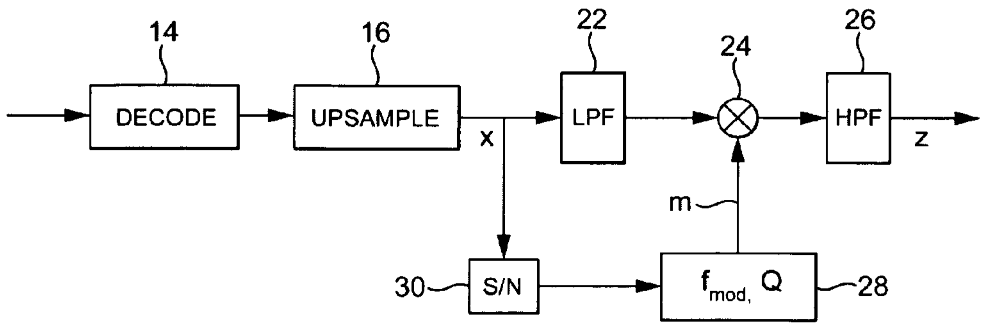
FIG. 3 is a schematic block diagram of a system according to one embodiment.

FIG. 3 is a schematic block diagram illustrating an excitation regeneration system for use in a receiver receiving speech signals over a transmission channel. The decoder 14 and up-sampler 16 perform functions as described with reference to FIG. 2. That is, the incoming signal is decoded and up-sampled from 8 kHz to 12 kHz. A low pass filter 22 is provided for some embodiments to select a region of the narrowband speech signal x for modulation, but this is not required in all embodiments and will be described later.

A modulator 24 receives a modulation signal m which modulates a range of frequencies of the speech signal x to generate a modulated signal y. If the filter 22 is not present, this is all frequencies in the narrowband speech signal. In this embodiment, the modulation signal is at 2 kHz and so moves the frequencies 0-4 kHz into the 2-6 kHz range (that is, by an amount 2 kHz). The signal y is passed through a high pass filter 26 having a lower limit at 4 kHz, thereby discarding the 0-4 kHz translated signal. Thus a high band reconstructed speech signal z is generated, the high band being the target frequency band of 4-6 kHz. The regenerated high band signal is subject to a spectral envelope and the resulting signal is added back to the original speech signal x to generate a speech signal r as described with reference to FIG. 2.

The modulation signal m is of the form$2\pi f_{mod}n+\phi$, where $f_{mod}$ denotes the modulating frequency, $\phi$ the phase and n a running index. The modulation signal is generated by block 28 which chooses the modulating frequency f mod and the phase $\phi$. The modulation frequency $f_{mod}$ is determined such as to preserve the harmonic structure in the regenerated excitation high band. In the present implementation, the modulating frequency is normalised by the sampling frequency.

Taking the specific example, consider the pitch frequency to be 180 Hz, then the closest frequency to 2 kHz that is an integer multiple of the pitch frequency is floor(200/180)*180 (1980 Hz). Normalised by 1200 Hz it becomes 0.165. For a sampling frequency (after upsampling) of 12 kHz and a value of 2 kHz of the frequency shift, the frequency $f_{mod}$ can be expressed as $f_{mod}$=floor(p/6)/p, where p represents the fractional pitch-lag.

The speech signal x is in the form [x(n), . . . , x(n+T−1)] which denotes a speech block of length T of up-sampled decoded narrow band speech. To ensure signal continuity between adjacent speech blocks, the phase $\phi$ is updated every block as follows $\phi=_{mod}(\phi+\pi f_{mod}T,2\pi)$, where mod(.,.) denotes the modulo operator (remainder after division). Each signal block of length T is multiplied by the T-dim vector $[\cos(2*\pi*f_{mod}*1+\phi), \ldots \cos(2*\pi*f_{mod}*T+\phi)]$. Thus, $y=[y(n), \ldots y(n+T-1)]=[2x(n)\cos(2\pi f_{mod}+\phi), \ldots 2x(n+T-1)\cos(2\pi f_{mod}T+\phi)]$.

The frequency band of the narrow band speech x which is translated can be selected to alleviate metallic artefacts by selection of a frequency band that is more likely to have harmonic structure closer to that of the missing (high) frequency band, and to translation of narrow band noise components (by selection of a frequency band that shows a good signal-to-noise ratio or by averaging a set of translated signals with overlapping bands).

Figure 4A:
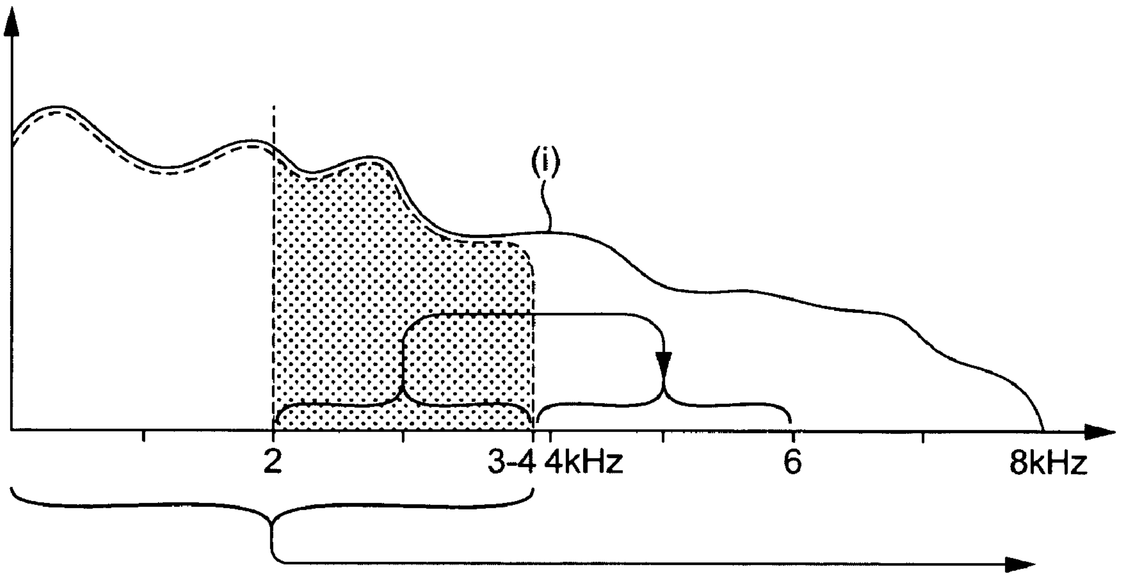
FIGS. 4A and 4B are graphs illustrating a typical speech spectrum in the frequency domain.

Reference will now be made to FIG. 4A to describe how the preceding described embodiment translates a frequency band which has a harmonic structure close to that of the missing high frequency band. FIG. 4A shows the spectrum of the speech signal in the frequency domain. "i" denotes the envelope of speech as originally recorded, and "ii" denotes the envelope for transmission in the 0.3-3.4 (approximated as 0-4) kHz range. By application of a modulation signal with a frequency of 2 kHz to all the frequencies in the transmitted narrowband speech (envelope ii), the spectrum is shifted upwards by 2 kHz, denoted by the arrow on FIG. 4A. This has the effect of moving the 0-2 kHz range up to 2-4 kHz, and the 2-4 kHz range up to 4-6 kHz. The high pass filter 26 filters out the signal below the 4 kHz level and thus regenerates the missing high band 4-6 kHz speech.

Figure 4B:
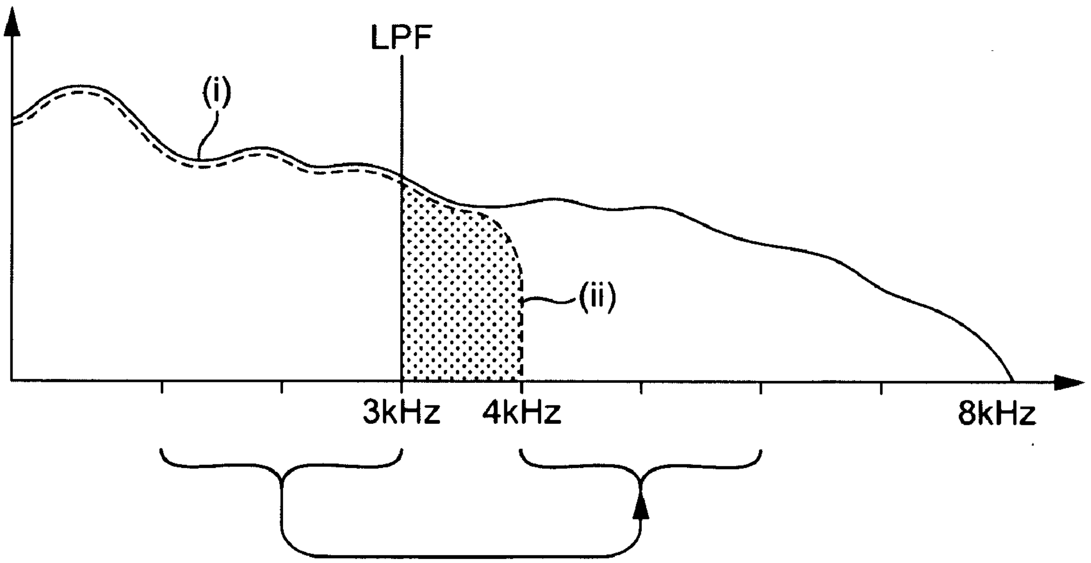

An alternative possibility is shown in FIG. 4B. If a modulating frequency of 3 kHz is applied, the spectrum shifts by 3 kHz, moving the 0-1 kHz range to 3-4 kHz, and the 1-3 kHz range to 4-6 kHz. The 0-1 kHz translation is filtered out with the high pass filter 26. In order to avoid aliasing, in this embodiment the low pass filter 22 filters out frequencies above 3 kHz so that these are not subject to modulation. It can be seen that by using this technique, it is possible to select frequency bands of the transmitted narrowband speech by controlling the modulating frequency. One possibility, as mentioned above, is to select the frequency bands by measuring the signal-to-noise ratio of frequencies in the narrowband speech. In FIG. 3, block 30 is shown as having this function.

The S/N block 30 receives the speech signal x and has a process for evaluating the signal to noise ratio for the purpose of selecting the frequency band that is to be translated.

Figure 5:
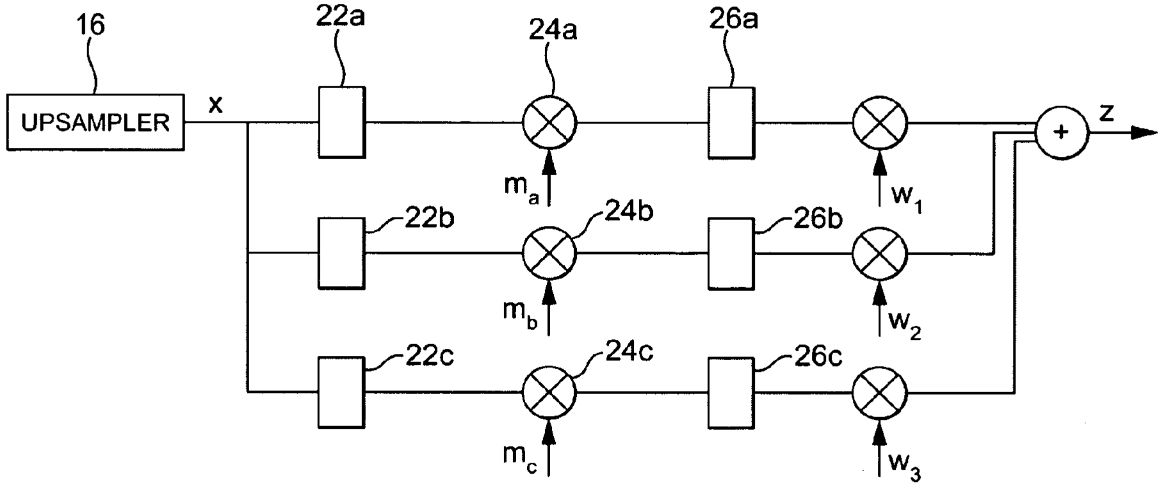
FIG. 5 is a schematic block diagram of a system according to another embodiment.

FIG. 5 is a schematic block diagram of a high band regeneration system which allows for a set of translated signals with overlapping or non-overlapping bands to be averaged. For example, the band 1 to 3 kHz could be taken and averaged with the band 2 to 4 kHz for regeneration of excitation in the 4 to 6 kHz range. This allows simultaneous excitation regeneration and noise reduction by varying the modulation frequency. FIG. 5 shows the speech signal x from the up-sampler 16 being supplied to each of a plurality of paths, three of which are shown in FIG. 5. It will be appreciated that any number is possible. The signal is supplied to a low pass filter in each path 22*a*, 22*b* and 22*c*, each low pass filter being adapted to select the band which is to be translated by setting an upper frequency limit as described above. Not all paths need to have a filter.

The low pass filtered signal from each filter is supplied to respective modulator 24*a*, 24*b*, 24*c*, each modulator being controlled by a modulation signal ma, mb, mc at different frequencies. The resulting modulated signal is supplied to a high pass filter 26*a*, 26*b*, 26*c* in each path to produce a plurality of high band regenerated excitation signals. The high pass filters have their lower limits set appropriately, e.g. to 4 kHz lower limit of the missing (or desired target) high band, if different. The signals are weighted using weighting functions 34*a*, 34*b*, 34*c* by respective weights w1, w2, w3, and the weighted values are supplied to a summer 36. The output of the summer 36 is the desired regenerated excitation high band signal. This is subject to a spectral envelope 20 and added to the original narrow band speech signal x as in FIG. 2 to generate the speech signal r.

The described embodiments of the present invention have significant advantages when compared with the prior art approaches. The approach described herein combines the preservation of harmonic structure and allows for the selection of a frequency band that is more likely to have a harmonic structure closer to that of the missing (high) frequency band, thus alleviating some of the metallic artefacts. Furthermore, if the original narrow band speech signal contains noise (due to acoustic noise and/or coding) it is beneficial to spectrally translate a region of the narrow band speech signal that shows the highest signal-to-noise ratio or perform several different spectral translations and linearly combine these to achieve simultaneous excitation regeneration and noise reduction (as shown in FIG. 5). *In the extreme case of zero linear combination weight for some frequency regions, this becomes equivalent with combining frequency intervals of less than 2 kHz to form a band of for example 2 kHz width. Also, the same frequency component may be replicated more than once within the 2 kHz range. In the general case number frequency shifted versions would be filtered each through a specific weighting filter and then added to create the combined signal in the full frequency range of interest.

By using a set of overlap/non-overlap sub-bands, it is possible to regenerate a given frequency band with less artefacts than would otherwise be experienced.

The invention claimed is:

1. A method of regenerating wideband speech from narrowband speech, the method comprising:

receiving samples of a narrowband speech signal in a first range of frequencies;

modulating received samples of the narrowband speech signal with a modulation signal having a modulating frequency adapted to upshift each frequency in the first range of frequencies by an amount determined by the modulating frequency wherein the modulating frequency is selected to translate into a target band a selected frequency band within the first range of signals, wherein the modulating frequency is normalised with respect to a sampling frequency used for generating the samples of the narrowband speech signal prior to modulation of the received samples;

filtering the modulated samples using a high pass filter to form a regenerated speech signal in the target band, wherein the lower limit of the high pass filter defines the lowermost frequency in the target band; and combining the narrow band speech signal with the regenerated speech signal in the target band to regenerate a wideband speech signal.

2. A method according to claim 1, wherein the first range of frequencies are all the frequencies in the narrowband speech signal.

3. A method according to claim 1, wherein the modulating frequency matches the bandwidth of the target band.

4. A method according to claim 1, further comprising filtering the narrowband speech signal using a low pass filter to select from all frequencies of the narrowband speech signal a first range of frequencies having an uppermost frequency defined by the low pass filter.

5. A method according to claim 4, wherein the modulating frequency is greater than the bandwidth of the target band, the low pass filter preventing aliasing in the regenerated wideband.

6. A method according to claim 1, further comprising determining the signal to noise ratio in one or more ranges of frequencies in the narrowband speech signal, and selecting the first range of frequencies to include frequencies with a highest signal-to-noise ratio.

7. A method according to claim 1, comprising:

supplying the received samples of the narrowband speech signal to each of a plurality of paths;

modulating the samples on each path with a respective modulation signal;

on each path filtering the modulated samples using a high pass filter; and combining the filtered signals to form the regenerated speech signal in the target band.

8. A method according to claim 7, further comprising low pass filtering the samples on one or more of the paths to select a first range of frequencies for that path.

9. A method according to claim 7, wherein the filtered signals are combined using weightings applied to each filtered signal.

10. A method according to claim 1, wherein the samples of the narrowband speech signal are received in blocks, the modulation signal having a phase which is updated for each successive block.

11. A method according to claim 1, wherein the regenerated speech signal in the target band is subject to an estimated spectral envelope prior to the combining step.

12. A system for generating wideband speech from narrowband speech, the system comprising:

means for receiving samples of a narrowband speech signal in a first range of frequencies;

means for modulating received samples of the narrowband speech signal with a modulation signal having a modulating frequency adapted to upshift each frequency in the first range of frequencies by an amount determined by the modulating frequency wherein the modulating frequency is selected to translate into a target band a selected frequency band within the first range of signals, wherein the modulating frequency is normalised with respect to a sampling frequency used for generating the samples of the narrowband speech signal prior to modulation of the received samples;

a high pass filter for filtering the modulated samples to form a regenerated speech signal in a target band when the lower limit of the high pass filter is above the uppermost frequency of the narrowband speech; and means for combining the narrowband speech signal with the regenerated speech signal in the target band to regenerate a wideband speech signal.

13. A system according to claim 12, comprising means for selecting said first range of frequencies from all frequencies in the narrowband speech signal.

14. A system according to claim 12, comprising means for generating the modulation signal, said means comprising controlling the modulating frequency and controlling a phase of the modulation signal.

15. A system according to claim 12, comprising means for determining the signal-to-noise ratio at each frequency one or more ranges of frequencies in the narrowband speech signal, said first range of frequencies being those with the highest signal-to-noise ratio.

16. A system according to claim 12, comprising a plurality of paths, each path receiving samples of a narrowband speech signal, there being a plurality of modulating means associated respectively with the paths and a plurality of high pass filters associated respectively with the paths, the system further comprising means for combining the outputs of the high pass filters on each path to form the regenerated speech signal in the target band.

17. A system according to claim 16, wherein at least one of said paths comprises means for selecting the first range of frequencies from the narrowband speech signal.

18. A system according to claim 16, further comprising weighting means associated with each path for weighting the modulated, filtered signals prior to the combining means.

19. A system according to claim 13, wherein the selecting means is a low pass filter.

* * * * *